United States Patent [19]
Muresan

[11] Patent Number: 5,862,352
[45] Date of Patent: Jan. 19, 1999

[54] VARIABLE PERIOD AND ASSERTION WIDTH REQ/ACK PULSE GENERATOR FOR SYNCHRONOUS SCSI DATA TRANSFERS

[75] Inventor: Matthew C. Muresan, Fort Collins, Colo.

[73] Assignee: LSI Logic Corporation, Milpitas, Calif.

[21] Appl. No.: 796,707

[22] Filed: Feb. 6, 1997

[51] Int. Cl.⁶ ..................................................... G06F 13/14
[52] U.S. Cl. ........................................... 395/285; 395/557
[58] Field of Search ..................................... 395/309, 281, 395/285, 287, 822, 557

[56] References Cited

U.S. PATENT DOCUMENTS

| | | |
|---|---|---|
| 4,851,998 | 7/1989 | Hospodor . |
| 4,965,801 | 10/1990 | DuLac ..................................... 371/40.1 |
| 5,253,348 | 10/1993 | Scalise . |
| 5,276,807 | 1/1994 | Kodama et al. . |

*Primary Examiner*—Glenn A. Auve
*Attorney, Agent, or Firm*—David K. Lucente

[57] ABSTRACT

A circuit for embedding within a SCSI control device for generating REQ or ACK signals in a flexible manner as required for SCSI synchronous data transfer mode. The circuit of the present invention utilizes a single counter and associated logic to provide flexible waveform generation of the REQ or ACK signal in a SCSI control device. The counter value counts up from zero and is compared against one of two values applied to a comparator. The first value is the desired period (duration) of the assertion of the REQ/ACK signal. When this count value is reached, the counter is restarted, the REQ/ACK signal is de-asserted, and the second count value—the de-assertion time—is applied to the comparator. When the second count is reached, the cycle starts over. An enable and reset signal allow other portions of the SCSI control device to start, stop, and reset the counter circuit of the present invention as required for SCSI synchronous data transfer controls. An alternative embodiment of the invention utilizes a down counter circuit which may embed a comparison against zero thereby obviating the need for a separate comparator circuit. The waveform generated may be applied to either the REQ signal in a target mode of the SCSI device or to the ACK signal in the initiator mode of the SCSI device.

15 Claims, 2 Drawing Sheets

VARIABLE PERIOD AND ASSERTION WIDTH REQ/ACK PULSE GENERATOR FOR SYNCHRONOUS SCSI DATA TRANSFERS

BACKGROUND OF THE INVENTION

1. Field of the Invention

The present invention relates to SCSI bus interface circuits and in particular relates to a circuit for generation of variable period and variable width REQ or ACK signal pulses as used in synchronous SCSI bus transfers.

2. Description of Related Art

Small Computer System Interface (SCSI) buses are common interconnect buses between computer systems and peripheral devices such as mass storage devices. The SCSI bus is a parallel bus comprising a number of parallel data signal paths (collectively referred to as the data bus) and a plurality of control signal paths to coordinate the exchange of information over the bus. A device wishing to initiate communications with another device is referred to as an initiator and the other device is referred to as the target.

The REQ and ACK control signals of the SCSI bus are used to pace the rate of transfer of information over the data bus. The target applies a signal to the REQ signal path to assert that it is ready for the next data transfer. The initiator applies a signal to the ACK signal path to assert that the transfer has completed. This sequence continues for each unit of data transferred until the transfer is completed (or interrupted for other reasons).

Generally, SCSI buses operate in one of two data transfer modes: asynchronous transfers and synchronous transfers. In the asynchronous transfer mode, each unit of data transferred requires a complete cycle of the REQ and ACK signals. Specifically, for each transfer, the REQ signal is asserted by the target, followed by assertion of the ACK signal by the initiator (indicating that the transfer is complete), followed by de-assertion of the REQ signal, lastly followed by de-assertion of the ACK signal. This asynchronous mode of data transfer is limited, in part, by the minimum timing requirements for the assertion and de-assertion of the REQ and ACK signals. Other timing constraints of asynchronous transfer mode further limit the maximum bandwidth available.

In read operation of the synchronous transfer mode, a number of data transfers may be completed by REQ signals from the target before a first ACK signal is required from the initiator. The number of such transfers permitted before an ACK signal is required is a configurable parameter referred to as the REQ/ACK offset. In a write operation, one or more REQ signal assertions precede the data and ACK signal. So long as the differences between the number of REQ signals asserted and the number of ACK signals asserted is less than the REQ/ACK offset parameter value, the transfer may continue (until exhaustion or interruption). This counting mechanism for pacing of transfers enables faster transfer. Bursts of data are thereby transferred without awaiting the handshake signal for each unit of transfer.

Parameters may be programmed in each SCSI device to define the REQ/ACK offset as well as other parameters used in the REQ/ACK handshake protocol for synchronous transfer mode. Specifically, a SCSI SDTR command is used to "negotiate" the REQ/ACK offset value as well as a transfer period. The transfer period is the minimum time allowed between leading edges of successive REQ pulses and of successive ACK pulses to meet the device requirements for successful reception of data.

Programmable parameters define the pulse timing of the REQ or ACK signal pulses. The assertion period is the minimum time that a target shall assert REQ while using synchronous data transfers (or the assert time for ACK with respect to an initiator device). The total pulse cycle period (transfer period) is also specified to fully characterize the pulse timing. The de-assertion period of the signal may be derived from the transfer and the assertion period.

This collection of programmable parameters permit flexible definition of the period and assertion shape (timing) of the REQ and ACK pulses used in SCSI synchronous transfer mode. By supporting shorter transfer period times and shorter pulse width timings, the synchronous data transfer rate can be increased dramatically as is known in the art. Specifically, it is presently known to achieve transfer rates as high as 40 MB per second on an 8-bit wide SCSI bus operating in synchronous transfer mode.

SCSI interface circuits in devices therefore include circuits for programming the waveform timing and period of REQ and ACK pulses for application to the SCSI bus signal paths. SCSI interface circuits (typically VLSI integrated circuits—ICs) typically include a section whose function is to flexibly control the timing and period of the REQ and ACK pulses. The generation of REQs and ACKs is complicated in that each device type (target or initiator) may be different and therefore capable of differing signal speeds. A REQ/ACK generator design must therefore account for the various combinations of functions and states.

Prior REQ/ACK generation circuits may have utilized complex finite state machine models and/or a plurality of counter circuits in their designs to achieve this flexible programmability. Such prior solutions are relatively complex. It is always a problem in IC designs to minimize complexity by reducing the number of lower level circuits (gates) required for a particular function. Simplicity in the design, as measured by reduced gate count, typically translate to a number of important benefits including: smaller chip/wafer size, lower power consumption, reduced gate delays (higher speeds), and others.

It is apparent from the above discussion that a need exists for a simpler REQ/ACK pulse signal generator for integration into SCSI interface peripheral control integrated circuits.

SUMMARY OF THE INVENTION

The present invention solves the above and other problems, thereby advancing the state of the useful arts, by providing a simple circuit for generation of REQ and ACK pulses in a SCSI interface peripheral controller integrated circuit. The circuit of the present invention utilizes a single counter device for counting both assertion and de-assertion time of the pulsed signal (the waveform shape and period). Whereas prior techniques used multiple counters or complex finite state machines, the present invention is a simpler circuit.

Two values are provided in registers by external circuits (e.g., a controlling microprocessor) within the SCSI controller which embodies the counter circuit of the present invention. A first value represents the period of the REQ/ACK signal assertion—the total time for the REQ or ACK signal to be asserted. The second value is the REQ/ACK signal de-assertion period—the total time the REQ or ACK signal is to remain de-asserted following the assertion period. The sum of the two period values is the period of the complete cycle of a single REQ or ACK signal. The two period duration values are represented as count values in the registers indicating the number of clock cycles for which the signals are to be asserted or de-asserted. Circuits within the SCSI control device generate the appropriate counter values knowing the clock rate supplied to the counter circuit of the present device and using the parameter values supplied by the SDTR negotiation.

A MUX selects the first value, the assertion period, to apply to a comparator circuit for comparison with the counter circuit. When the first count is reached, the state of the REQ/ACK signal is inverted (de-asserted) and the second count value is applied to the comparator. When the second count value is reached, the circuit again inverts the REQ/ACK signal and begins the entire cycle again with the first count value.

An enable signal of the counter circuit is used by other logic in the SCSI control device to pause and resume the counter circuits of the present invention. Associated logic assures that no pulse signal is held beyond its specified timings. A reset signal of the counter circuits allows the counter's state to be reset by the SCSI control logic as required. As noted, the transfer may be paused if the REQ/ACK offset pacing rules so require. In addition, the transfer is stopped when the requisite transfer is completed or aborted. Logic within the SCSI control device embodying the counter circuits of the present invention determine when to start stop or reset the counter circuits of the present invention.

The output signal waveform generated by the present invention may be used either as the ACK signal in an initiator device or as the REQ signal in a target device. Other logic in the SCSI control device which embodies the present invention determines which signal path the waveform should be applied to as required for the particular transfer in process.

By sharing the counter for assertion and de-assertion timing of the REQ/ACK signal waveform generation, the present invention notably simplifies the circuitry required for SCSI synchronous data transfer REQ/ACK signal timing. Many varieties of counter devices may be applied in the present invention to implement the counter functions of the present invention.

It is therefore an object of the present invention to provide a circuit for generating REQ/ACK waveforms in a SCSI control device.

It is a further object of the present invention to provide a circuit with a single counter for generating REQ/ACK waveforms in a SCSI control device.

DETAILED DESCRIPTION OF THE PREFERRED EMBODIMENT

Figure 1:
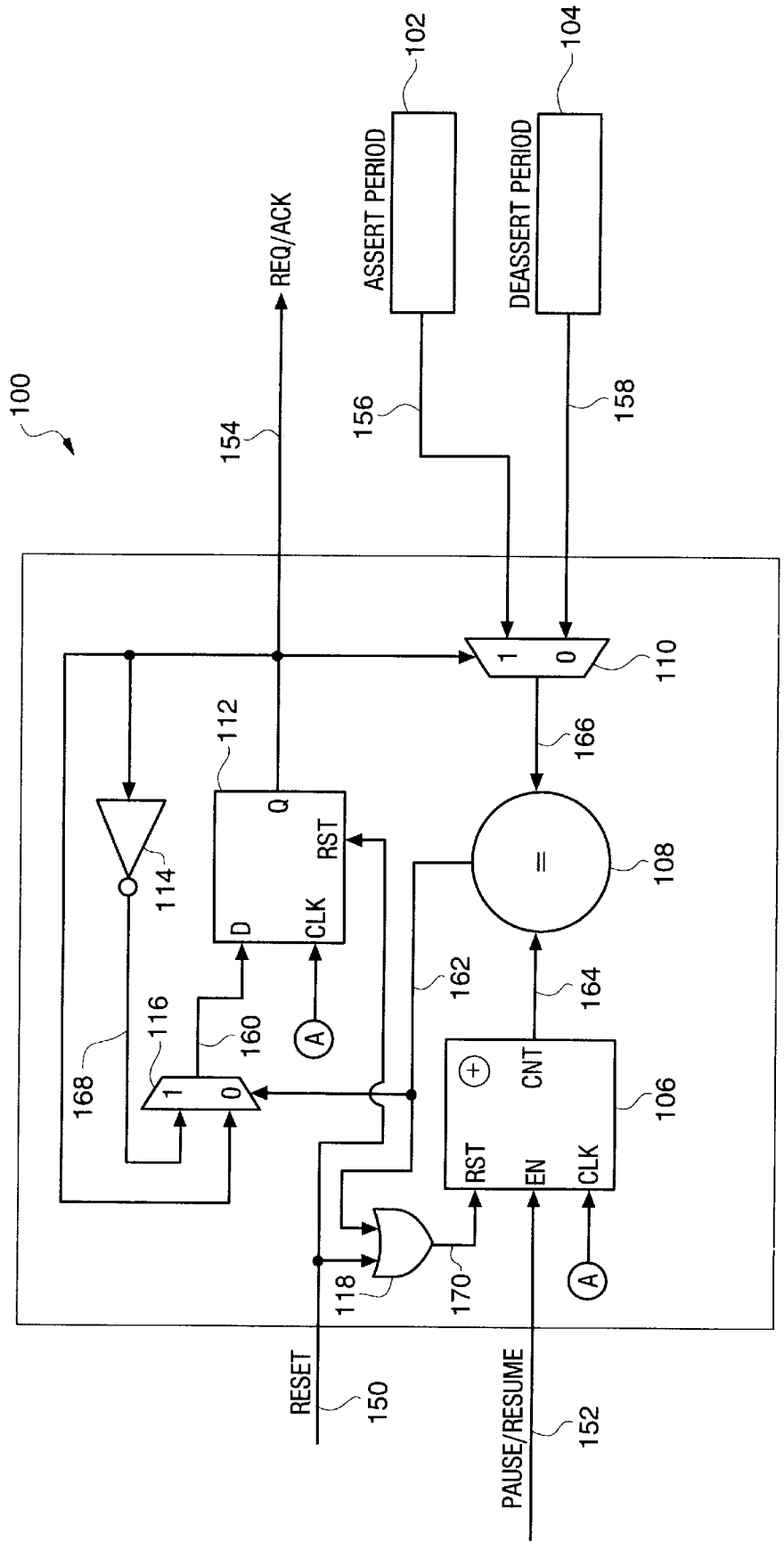
FIG. 1 is a block diagram of a first embodiment of the counter circuits of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

As described above, SCSI bus data transfers utilize a REQ and ACK signal to pace the exchange of each unit of data on the bus. As is well known in the art, the SCSI bus may be configured in a number of width such that the unit of data transfer may 8 bits, 16 bits, or other larger units. Also, as noted above, it is well known that the pulse timing (waveform shape) and pulse period for the REQ and ACK signals substantially determine the maximum transfer rates for both asynchronous and synchronous transfer modes. In particular, in synchronous transfer mode, the pulse shape and period for the REQ and ACK signals is flexibly defined by commands exchanged between the two communicating devices on the bus (so-called negotiation). SCSI control devices therefore incorporate circuits for flexibly generating a variety of pulse timings and periods for the REQ and ACK signals.

As is well known in the art it is a constant problem to simplify circuits within an integrated circuit design (IC). Simplicity tends to reduce the number of gates required which usually reduces the physical area of the IC (thereby further reducing chip costs), reduces power consumption, increases speed, and a number of other benefits. The present invention therefore provides a simple, novel, circuit for integration in a SCSI controller for generating programmable REQ and ACK signals.

It will be understood that the circuit of the present invention is usable for generation of either REQ signals when operating as a target device, or ACK signals when operating as an initiator device. The mode in which the present invention is utilized is determined by circuits external to the counter circuits of the present invention. The counter circuits of the present invention are therefore referred to here as generating REQ/ACK pulses or REQ/ACK waveforms. As used herein, reference to either REQ or ACK signals should be considered synonymous with regard to operation of the counter circuits of the present invention.

It is to be further understood that other circuits within a SCSI controller provide required data and control for operation of the counter circuits of the present invention. Such external circuitry, outside the counter circuits of the present invention are well known to those skill in the arts of SCSI controller designs. The counter circuits of the present invention represent components within the controller for the specific purpose of generating REQ/ACK signals of a specified period and shape (timing).

FIG. 1 is a block diagram of a first embodiment of the present in which an incrementing counter circuit is applied in conjunction with a comparator circuit to determine the timing and shape of the REQ/ACK pulses. Other circuits in the SCSI controller provide two registers for use by the counter circuits of the present invention. The assert period register 102 defines the period of time during which the REQ/ACK signal is to be asserted and the de-assert period register 104 defines the period of time during which the REQ/ACK signal is to be de-asserted. The sum of the two values is therefore equal to the transfer period as defined by the SCSI specifications (noted above). These two register values, provided to the counter circuits of the present invention as input values, are derived by other circuits of the SCSI controller and stored in registers associated therewith. The values are determined and stored as count values corresponding to the number of pulses of a fixed frequency clock signal supplied to the counter circuits of the present invention (label "A" of FIGS. 1 and 2).

Circuit 100 (counter circuits of the present invention) includes counter 106 which increments from its zero reset value. The present value of counter 106 is applied to its output signal path 164 as an input to comparator 108. Counter 106 counts the number of pulses received on its CLK input (labeled "A"). The clock supplied to the circuit 100 (specifically to counter 106 and flip-flop 112) is a fixed frequency clock preferably having a frequency of about 80 MHz. This frequency is preferred because it is easily divided down to frequencies common to SCSI transfers. Mux 110 selects one of the two registers (102 or 104) as its input value via paths 156 and 158, respectively, and applies the selected value to its output path 166 as the other input to comparator 108.

Comparator 108 applies a signal (also referred to herein as a terminal count signal) to its output path 162 when the two values on its inputs are equal (e.g., when the counter value equals the selected register value). The terminal count signal on path 162 is applied through OR gate 118 to the RST input of counter 106 via path 170. This resets the counter 106 back to zero to begin counting CLK pulses anew.

D flip-flop 112 applies its present output value ("Q") to path 154 as the present REQ/ACK signal level. This signal on path 154 is applied to mux 110 to cause the mux to select one or the other of the input registers (102 and 104) as its selected input. The signal on path 154 is also applied as an input to hold/invert mux 116 and inverter 114. The output of hold/invert mux 116 is applied via path 160 to the D input of D flip-flop 112 to invert and latch the output signal of the flip-flop.

Each time the terminal count signal is present on path 162, the following actions occur:

mux 110 switches its selected input to the presently non-selected input, counter 106 is reset to zero, and D flip-flop output (path 154—the REQ/ACK signal) is inverted.

In the initial reset state, the REQ/ACK signal on path 154 is de-asserted low (the reset state of flip-flop 112). Inverters and bus driver circuits in the SCSI controller external circuit 100 apply the proper signal levels to the SCSI bus corresponding to the signal on path 154, This state selects mux 110 to apply the de-assert period register 104 value to path 166 as an input to the comparator 108. Counter 106 is initially reset to zero. Other circuits in the SCSI controller may apply a reset signal to the RESET path 150 to assure that the flip-flop 112 and counter 106 are in their respective reset states. The SCSI controller eventually applies an enable signal to path 152 to resume operation of counter 106. When counter 106 reaches the value of the de-assert period register 104 comparator 108 asserts the terminal count signal on path 162. The terminal count signal, as noted above, resets counter 106 to zero and inverts the output of flip-flop 112. This in turn selects mux 110 to apply assert period register 102 value to path 166 as input to comparator 108. The next terminal count detected by comparator 108 inverts the logic once more to begin the cycle anew.

The values in assert period register 102 and de-assert period register 104 therefore determine the assertion period and de-assertion period for the REQ/ACK signal generated by the circuit 100 on path 154. The following state describes the operation of the circuit 100 at each pulse of the CLK signal (on label "A") given an assert period register 102 value of "x" and a de-assert period register 104 value of "y":

| Assert Count (102) | De-assert Count (104) | Count (106) | Comp. (108) | Terminal Count (162) | FF - D (160) | FF - Q REQ/ACK (154) |
|---|---|---|---|---|---|---|
| x | y | 0 | x > 0 | 0 | 0 | 0 |
| x | y | x - 1 | x > x - 1 | 0 | 0 | 0 |
| x | y | x | x = x | 1 | 1 | 0 |
| x | y | 0 | y > 0 | 0 | 1 | 1 |
| x | y | y - 1 | y > y - 1 | 0 | 1 | 1 |
| x | y | y | y = y | 1 | 0 | 1 |

The first column indicates the constant value of assert period register 102. The second column indicates the constant value of de-assert period register 104. The next column shows the present value of counter 106 (as applied to path 164). The next column indicates the comparison made by comparator 108 of its two present input values. The next column indicates the terminal count output signal of comparator 108. The next column indicates the signal applied to the D flip-flop 112 "D" input via path 160 through hold/invert mux 116. The last column indicates the output value "Q" of the D flip-flop 112 and therefore the present value of the REQ/ACK signal on path 154.

As noted above, the SCSI controller in which the circuit 100 is integrated applies a signal to the enable "EN" input path 152 of counter 106 to enable or disable operation of circuit 100. If, for example, the REQ/ACK offset rules require that the transfer be paused, the SCSI controller disables counter 106 from further operation by inverting the enable signal on path 152. In like manner, the SCSI controller may reset circuit 100 by applying a reset pulse signal on path 150. A reset may be useful when initializing a new operation or if an operation is terminated by an abort sequence.

Figure 2:
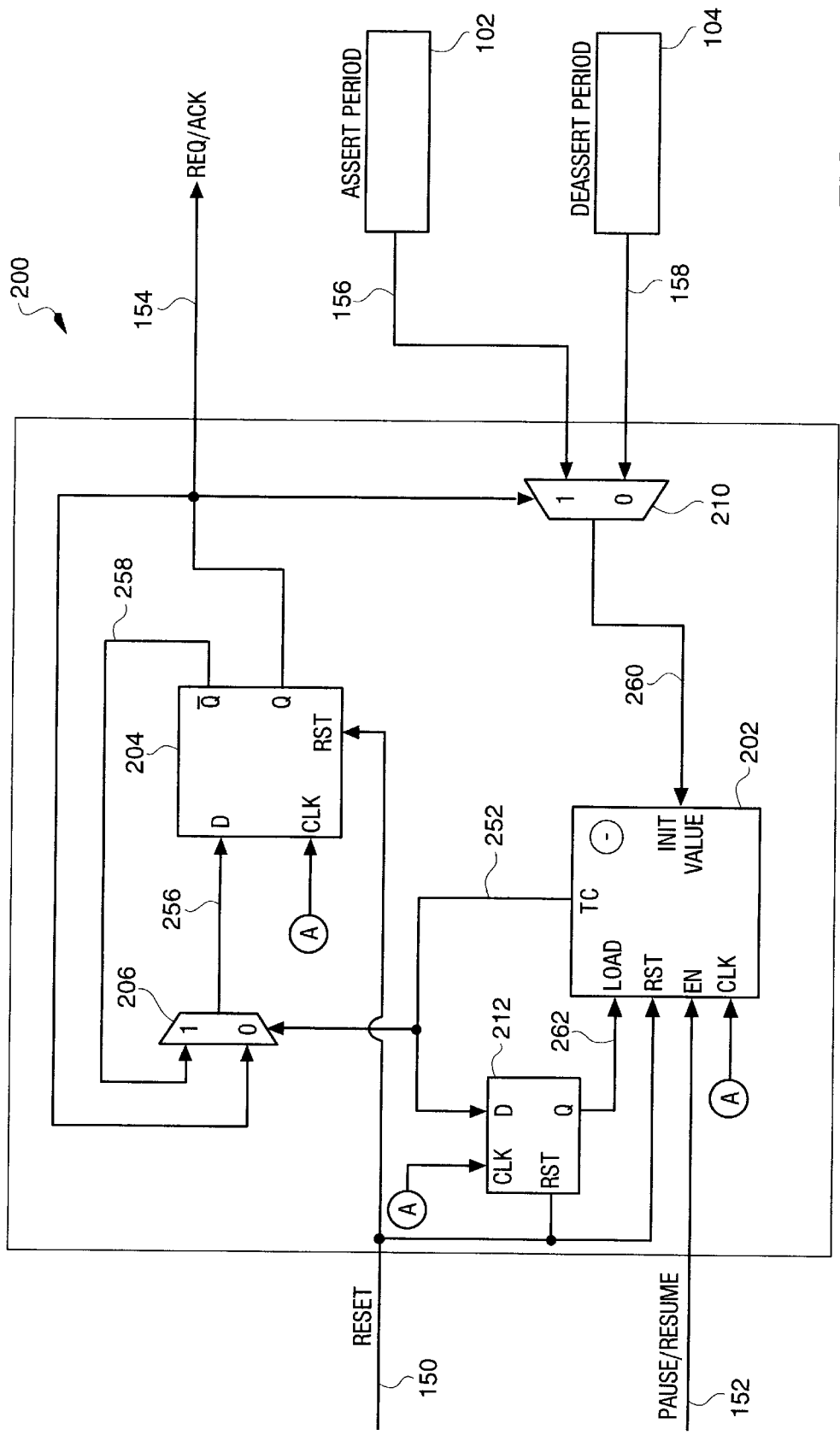
FIG. 2 is a block diagram of a second embodiment of the counter circuits of the present invention.

FIG. 2 is a block diagram of another embodiment of the circuit 200 of the present invention. Circuit 200 is functionally similar to circuit 100 of FIG. 1. Muxes 210 and 206 operate identically to muxes 110 and 106 of FIG. 1. The primary difference lies in counter 202, flip-flop 212, and flip-flop 204 and in the absence in FIG. 2 of comparator 108 and OR gate 118 of FIG. 1.

Counter 202 is a down counter having integrated terminal count detection comparing against reaching a zero value. An initial value, the presently selected value of mux 210, is loaded via path 260 as the initial value of the counter 202 when the load signal is asserted in accordance with the terminal count signal on path 262. The terminal count signal on path 252 is applied as input the D input to D flip-flop 212. The Q output (delayed one clock to await the inversion of selection of mux 210) is the applied to path 262 as the load input of counter 202.

When enabled ("EN" on path 152), counter 152 decrements its initial value until reaching a zero value then applies a signal "TC" indicating the terminal count condition on path 252. As above with respect to FIG. 1, the terminal count condition causes the REQ/ACK signal on path 154 to invert, causes mux 210 to select the other presently non-selected register value (e.g., switch between 102 and 104 as its selected input), and causes counter 202 to reload a new initial value.

D flip-flop 204 differs from D flip-flop 112 of FIG. 1 in that it provides both an output signal ("Q" as in FIG. 1) and the inverted output signal to thereby obviate the need for an inverter (e.g., 114 of FIG. 1).

When reset and started to count, counter 202 will immediately apply a terminal count signal to its TC output (the reset condition of the counter) so as to immediately cause an assertion of the REQ/ACK signal on path 154. The assert period register 102 will therefore be loaded first so as to immediately start the REQ/ACK signal waveform with an asserted level.

The particular parts required for implementation of the circuits 100 or 200 of the present invention are well known to those skilled in the art. Many digital design libraries have specialized components with still higher levels of integration available. The best known mode of practicing the present invention is therefore dependent to some extent on the particular design tools and libraries used. FIGS. 1 and 2 are therefore intended to present equivalent modes of implementing the present invention. However, one skilled in the art may recognize a variety of equivalent logic designs for use of a single counter to generate REQ/ACK waveforms. In particular, many variations of counting circuits may be employed to implement the counting functions of the present invention. For example, a shift register wherein a shifting bit's position in the shift register indicates a number of clock pulses and thereby a time period may be utilized in place of a standard up or down counter (e.g., counters 106 and 202 above). In such a scenario, comparator circuit 108 may be modified to compare based upon a bit-wise comparison.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a SCSI control device, a circuit for generation of REQ/ACK waveforms applied to an output of said circuit comprising:

a counter having an output to which said counter applies a current count value;

a first mux having two inputs and an output to which said first mux selectively applies one of two count values applied to each of its two inputs, respectively;

a comparator having one input connected to the output of said counter and having a second input connected to the output of said first mux and having an output indicating the equality of the values applied to the inputs of said comparator;

a second mux having two inputs and having an output to which said second mux selectively applies one of its two inputs wherein said second mux controllably selects one of its two inputs in accordance with the output of said comparator;

an inverter having an input and having an output connected to a first of said two inputs of said second mux; and a flip-flop having an input connected to said output of said second mux and having an output connected to said output of said circuit and connected to a second of said two inputs of said second mux and connected to said input of said inverter.

2. In a SCSI control device, a circuit for generation of REQ/ACK signal waveforms applied to an output of said circuit comprising:

counter means for counting a number of pulses of a fixed frequency clock signal, said counter generating a terminal count signal when a predetermined number of pulses are counted;

output signal generation means for inverting the level of a signal applied to said output of said circuit in response to generation of said terminal count signal; and mux means for selectively applying a first value to said counter means corresponding to said predetermined number of pulses and for selectively applying a second value to said counter means corresponding to another predetermined number of pulses, wherein said mux selects between application of said first value and application of said second value in response to generation of said terminal count signal.

3. The circuit of claim 2 wherein said counter means includes:

a counter connected to a fixed frequency clock signal source and having an output to which said counter applies its present count value; and a comparator having an input connected to the output of said counter and having an input connected to said mux means for receiving said first value and said second value and wherein said terminal count signal comprises an output of said comparator indicating the equality of the values applied to the inputs of said comparator.

4. The circuit of claim 3 wherein said counter has an enable signal to pause and resume operation of said counter in accordance with a signal applied to said enable signal.

5. The circuit of claim 4 wherein said counter has a reset input signal to reset the starting count value in said counter to zero in response to a signal applied to said reset input signal.

6. The circuit of claim 5 wherein said reset input signal is connected to said output of said comparator to reset said counter in response to said comparator detecting equality of the present counter value with said first value or said second value.

7. The circuit of claim 2 wherein said output signal generation means includes:

an inverter having an input and an output;

a mux having two inputs and an output; and a flip-flop having an input signal, wherein an output signal of said circuit comprises an output signal of said flip-flop, and wherein said output signal of said flip-flop is connected to said input of said inverter and to a first of said inputs of said mux means, and wherein said output of said inverter is connected to a second of said inputs of said mux means, and wherein said output of said comparator is connected to said mux means to select between said two inputs of said mux means.

8. The circuit of claim 2 wherein said counter means includes:

a counter connected to a fixed frequency clock signal source and having an input from which an initial value is loaded and wherein said terminal count signal is an output signal of said counter indicating that said counter has counted down to a present value of zero.

9. The circuit of claim 8 wherein said counter has an enable signal to pause and resume operation of said counter in accordance with a signal applied to said enable signal.

10. The circuit of claim 9 wherein said counter has a load input signal to load an initial value in said counter corresponding to the value present on said input of said counter in response to a signal applied to said load input signal.

11. The circuit of claim 8 wherein said output signal generation means includes:

an inverter having an input and an output;

a mux having two inputs and an output; and a flip-flop having an input signal, wherein an output signal of said circuit comprises an output signal of said flip-flop, and wherein said output signal of said flip-flop is connected to said input of said inverter and to a first of said inputs of said mux means, and wherein said output of said inverter is connected to a second of said inputs of said mux means, and wherein said output of said counter is connected to said mux means to select between said two inputs of said mux means.

12. In a SCSI control device, a method for generation of REQ/ACK signal waveforms applied to an output of a circuit comprising the steps of:

counting a number of pulses of a clock signal;

generating a terminal count signal when a one of at least two predetermined numbers of pulses are counted; and inverting the output of the circuit in response to the generation of said terminal count signal.

13. The method of claim 12 further comprising the step of selecting the one of the at least two predetermined numbers of pulses in response to the generation of said terminal count signal.

14. In a SCSI control device, a circuit for generation of REQ/ACK signal waveforms applied to an output of said circuit comprising:

a terminal count signal generator that provides a terminal count signal that is responsive to at least one of a plurality of predetermined pulse numbers and an output signal; and an output signal generator that toggles the output signal in response to the terminal count signal.

15. The device of claim 14 wherein the output signal selects one of the plurality of predetermined pulse numbers.

* * * * *